United States Patent [19]

Leach

[11] 4,247,379

[45] * Jan. 27, 1981

[54] METHOD FOR CHEMICAL REACTIONS USING HIGH INTENSITY RADIANT ENERGY AND SYSTEM THEREFOR

[76] Inventor: Sam L. Leach, P.O. Box 2536, Palos Verdes Peninsula, Calif. 90274

[*] Notice: The portion of the term of this patent subsequent to Mar. 18, 1997, has been disclaimed.

[21] Appl. No.: 65,188

[22] Filed: Aug. 9, 1979

Related U.S. Application Data

[63] Continuation-in-part of Ser. No. 879,226, Feb. 21, 1978, Pat. No. 4,193,879.

[51] Int. Cl.³ .............................................. B01J 19/12
[52] U.S. Cl. ........................... 204/157.1 R; 204/158 R; 204/158 HA; 204/162 R; 204/163 R; 250/527
[58] Field of Search ................... 204/157.1 R, 158 R, 204/DIG. 11, 158 HA, 162 R; 250/527

[56] References Cited

U.S. PATENT DOCUMENTS 4,072,590  2/1978  Niemann et al. .............. 204/157.1 R

*Primary Examiner*—Howard S. Williams
*Attorney, Agent, or Firm*—Poms, Smith, Lande & Rose

[57] ABSTRACT

An apparatus for accomplishing photochemical reactions includes a series of reaction chambers and a heat exchanger. When the apparatus is employed for the production of hydrogen and hydrogen peroxide from water or water vapor, cold water is initially passed through the heat exchanger to cool the output gases; and then the water is further heated and turned to steam, prior to supplying it to the reaction chambers. The elongated photochemical reaction chambers are connected in series, with the water vapor being coupled to pass successively up one elongated reaction chamber, down the next and so forth. Each reaction chamber is provided with a central gas discharge device for producing characteristic output radiation at various lower frequencies. Enclosing the elongated gas discharged tube is a reaction zone or reaction chamber; and between the gas discharge tube and the reaction zone are arrangements including a metallic film, such as aluminum, which is highly transmissive to short wavelengths but which reflects the lower frequencies initially radiated by the gas discharge tube. Various arrangements including resonant cavities, a slotted shield, or coherent radiating material may also be provided to facilitate shifting of the lower frequencies from the gas discharge device to higher frequencies which will pass through the metallic coating, to irradiate the reactant with ultraviolet radiations.

41 Claims, 21 Drawing Figures

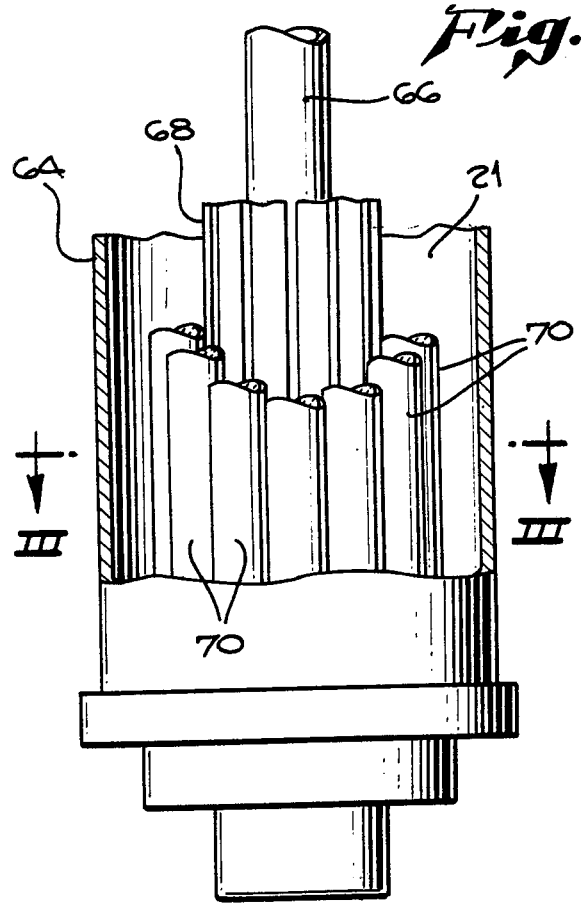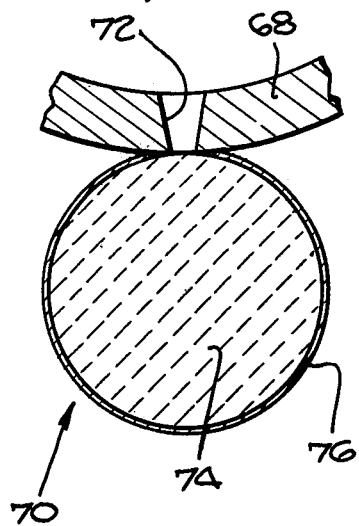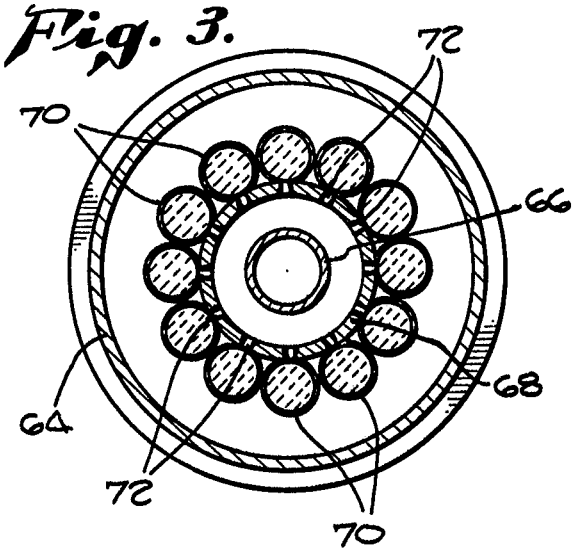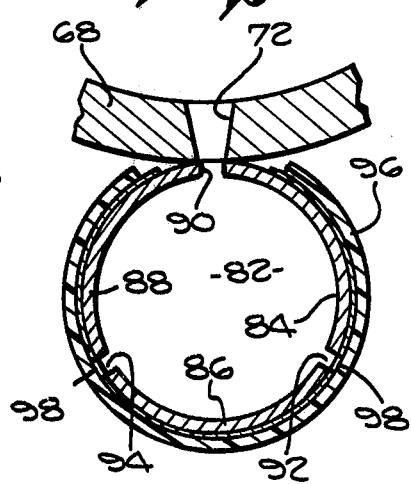

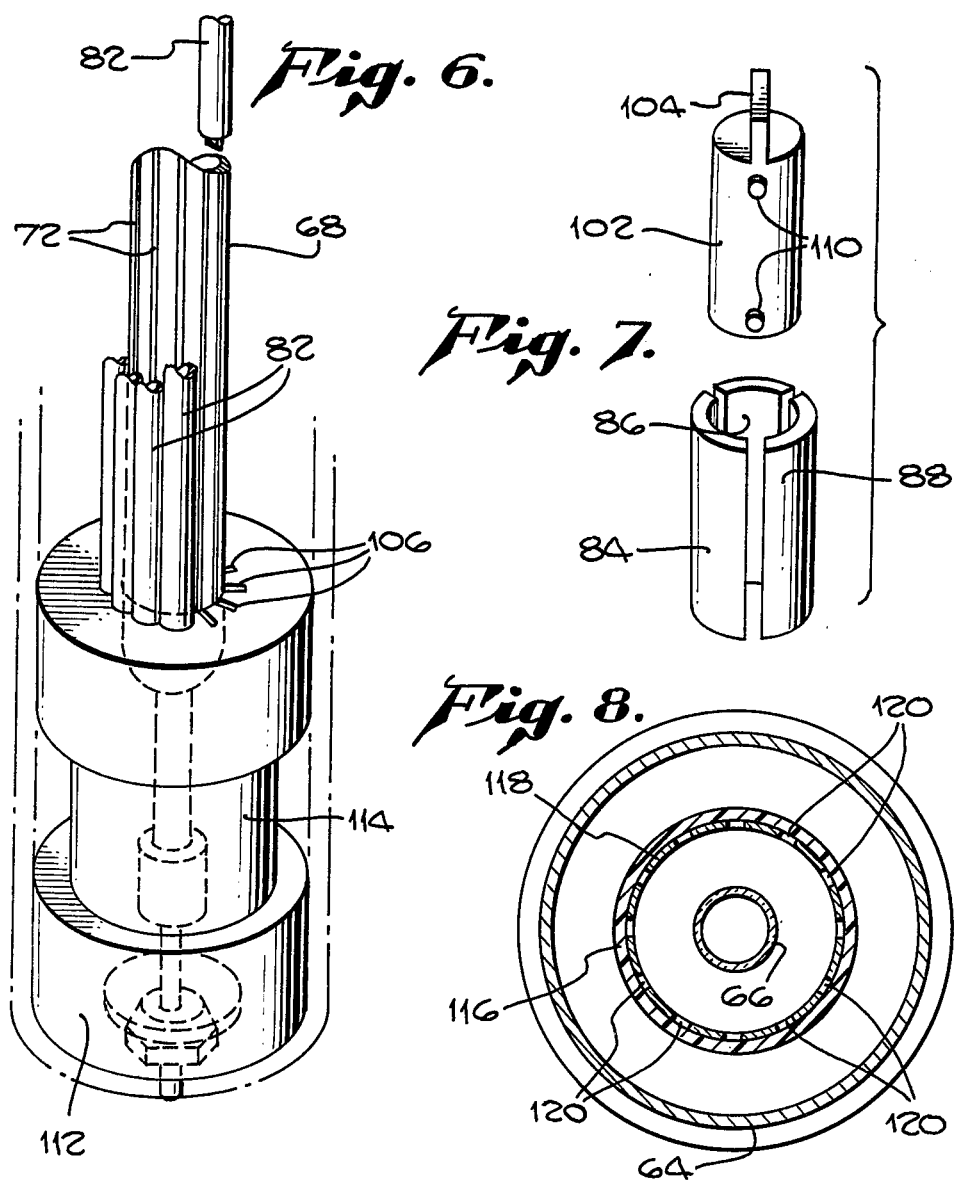
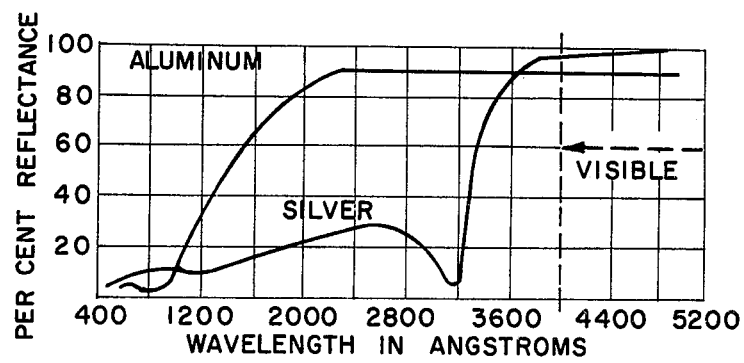

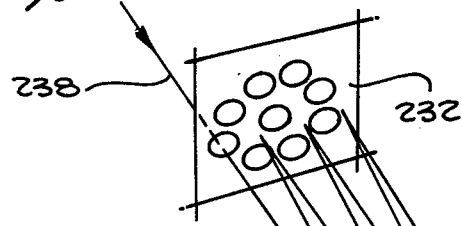
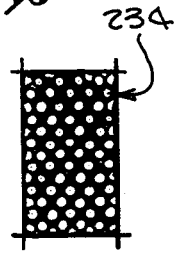
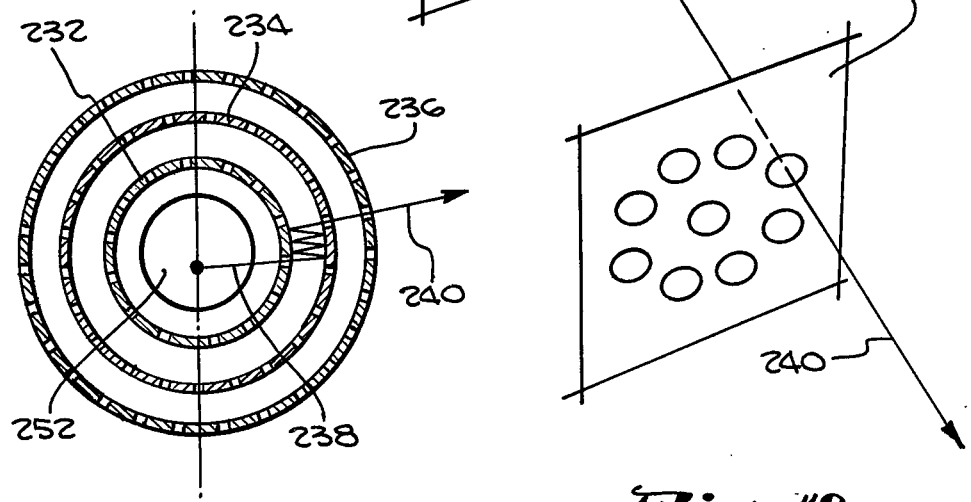
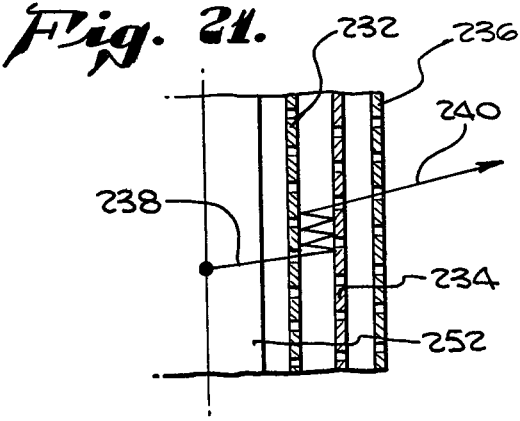
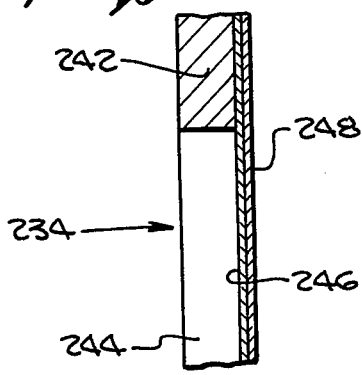

METHOD FOR CHEMICAL REACTIONS USING HIGH INTENSITY RADIANT ENERGY AND SYSTEM THEREFOR

REFERENCE TO RELATED PATENT APPLICATIONS

This patent application is a continuation-in-part of U.S. patent application Ser. No. 879,226, filed Feb. 21, 1978, now U.S. Pat. No. 4,193,879.

FIELD OF THE INVENTION

This invention relates to photochemical reaction techniques and apparatus.

BACKGROUND OF THE INVENTION

As disclosed in my prior U.S. Pat. No. 4,148,701, granted Apr. 10. 1979, and in my subsequent U.S. patent application cited hereinabove, and in the references cited therein, it has previously been proposed to dissociate gases by irradiating them with coherent radiation from laser apparatus; and mercury vapor gas discharge tubes have previously been proposed for use in the implementation of photochemical reactions.

In many cases, however, the reactant has high absorption to frequencies in the ultraviolet frequency band when high levels of radiation are present. Up to the present time it has not been practical to obtain very high intensity ultraviolet radiation on a commercial scale and at a reasonable cost.

Accordingly, a principal object of the present invention is to provide a relatively simple apparatus for the production of high intensity, high frequency ultraviolet irradiation for use in ionizing gases, in photochemical processes, and particularly for the dissociation of water vapor to form hydrogen and hydrogen peroxide.

SUMMARY OF THE INVENTION

In accordance with one aspect of the present invention, it has been determined that the output radiation from gas discharge tubes such as mercury vapor, sodium vapor, and other similar tubes, which have a large portion of the output energy at relatively low frequencies, can be raised to the higher energy ultraviolet range by the use of films such as thin metallic films of copper or silver, to permit the transmission only of the higher frequency ultraviolet wavelengths.

In cooperation with these selective transmission films, the apparatus includes other arrangements such as high frequency cavities bounded by reflective material, or laser-type material capable of harmonic generation, for facilitating the frequency shift.

Other features include arrangements for preheating the input water in a heat exchanger which cools the output gases, such as hydrogen or hydrogen peroxide; feedback arrangement for supplying limiting amounts of hydrogen or hydrogen peroxide back to each of the reaction chambers to increase the kinetic energy of the ongoing photochemical reaction; gas discharge pulsing arrangements for successively initiating chain reactions in the various reaction chambers included in a single system; and "flow through" arrangements for supplying the reactant from one end of the first of several parallel elongated reaction chambers, back through in the opposite direction in the adjacent reaction chamber and so forth throughout the entire series.

In one structural arrangement, a slotted reflecting cylinder encompasses the gas discharge tube, a series of reflectively coated laser rods are spaced around the slotted reflector, and the outer coating on each of the laser rods is cut away where it is adjacent an associated slot, to receive pumping energy from the gas discharge tube. With the outer coating on the laser rods being of aluminum or other frequency selective transmission material, only the harmonic radiation from the laser rods is radiated into the enclosing reaction chamber.

In another embodiment, a series of elongated resonant chambers are spaced around the gas discharge device, and have reflecting walls except for one slot for receiving radiation from the gas discharge device and additional openings for radiating higher frequency energy through a selective transmission film, into an outer reaction chamber. As more and more energy is pumped into the resonant chamber, the energy content increases, as it cannot escape, and finally the energy reaches such a high level that the frequency is shifted upward and the contained energy is "dumped" at the higher frequency levels through the selective transmission films. Incidently, this frequency shift phenomenon is similar to that which occurs in a kiln, as more and more energy is supplied to it and the temperature within the kiln increases from the infrared to a bright red and finally to white heat, radiating progressively higher frequencies as the energy within the kiln or reservoir increases.

In accordance with another embodiment of the invention, the entire space within and surrounding the gas discharge device may be formed into a resonant cavity with selected areas of the special transmittance film to radiate into the reaction chamber in accordance with the cavity dumping phenomenon mentioned hereinabove.

From a somewhat different aspect, the invention involves the intense irradiation of relatively concentrated gas molecules by photons having a higher energy content than that required to fully ionize the molecules; so that the resultant energetic particles, and subsequent energetic and powerful photons generated upon recombination of atoms and electrons, will provide further ionization of the gas molecules. Under conditions of relatively high gas molecular concentrations, wherein the ionization reaction is "caged" or "imprisoned" by other gas molecules, and under other conditions for precluding significant dissipation of energy, successive stages of ionization and finally of dissociation may be obtained from a single high energy ionization of a molecule by high energy photons. Further, when the reaction chamber is flooded with such high frequency photons, the direct, the indirect, and chain-produced ionization, all supplemented by multiphoton absorption, will produce high yields of the desired output gases.

Other object, features and advantages of the invention will become apparent from a consideration of the following detailed description and from the accompanying drawings.

BRIEF DESCRIPTION OF THE DRAWINGS

FIG. 2 is a partial cross-sectional view of the lower portion of one of the reaction chambers of FIG. 1;

FIG. 3 is a cross-sectional view taken along lines III—III of FIG. 2;

FIG. 4 is a schematic detail of a portion of the structure of FIG. 2;

FIG. 5 is a schematic showing of an alternative arrangement which may be employed in the system of FIG. 1;

FIG. 6 is a cut-away partial showing of one method for mounting the elements of FIG. 5;

FIG. 7 is a detailed showing of certain constructional features which may be employed in the implementation of the arrangement of FIGS. 5 and 6;

FIG. 8 is a schematic showing of another arrangement which may be employed with the photochemical system of FIG. 1;

FIG. 9 shows a plot of reflectance versus wavelength for certain metallic films which may be employed in connection with the present system;

FIG. 17 is a diagrammatic showing of the transmission of radiation through a series of apertured plates;

FIG. 18 is a showing of a typical apertured screen which may be employed in the implementation of the invention;

FIG. 19 is an enlarged view of a frequency selective filter structure; and

FIGS. 20 and 21 are diagrammatic showings of the incorporation of the type of structure shown in FIG. 17 into a concentric geometry surrounding a gas discharge tube.

DETAILED DESCRIPTION

Figure 1:
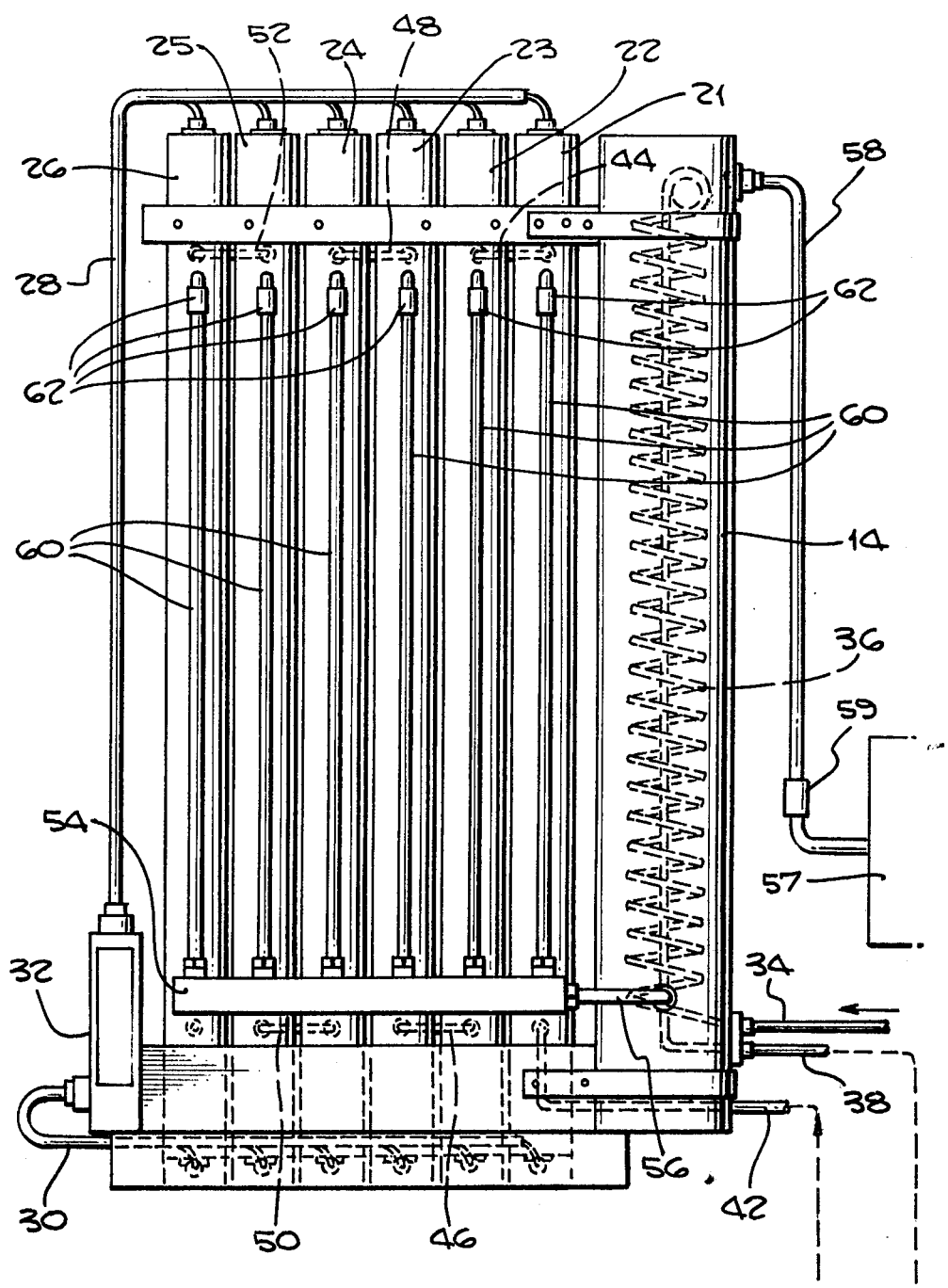
FIG. 1 is a side view of a photochemical apparatus illustrating the principles of the present invention.

Referring more particularly to the drawings, FIG. 1 is a sideview of a photochemical apparatus illustrating the principles of the present invention. More specifically, the system of FIG. 1 includes as its major components, the heat exchanger 14 and a series of six reaction chambers 21 thru 26. A central gas discharge lamp, which may for example be a mercury vapor lamp, extends for most of the length of each of the reaction chambers 21 thru 26, and is centrally located in each of them, as will be disclosed in greater detail below. The electrical cables 28 and 30 extend from the electrical switching timing and power supply unit 32 to the individual terminals at the top and bottom of the gas discharge devices.

When the apparatus of FIG. 1 is employed to dissociate water, and to form hydrogen and hydrogen peroxide, water is initially supplied to the input metal tubing 34, is circulated through the coil 36 within the heat exchanger 14, and the warmed water is drawn off through another conduit 38. From conduit 38, the water is supplied to a conventional steam generator 40 and is returned to the apparatus as water vapor, through the metal tubing 42. It is supplied to the lower end of the reaction chamber 21, and is coupled by the tube 44 to the upper end of the next successive reaction chamber 22. After traversing the length of the chamber 22 to its bottom, it is coupled by the metal tubing 46 to the bottom of the next adjacent reaction chamber 23. Similarly, the water vapor and resultant product gases are interconnected from reaction chamber to reaction chamber by the metal tubing sections 48, 50 and 52, and the hydrogen and hydrogen peroxide product gases from reaction chamber 26 are coupled to the left-hand end of the manifold 54 and then connected by the larger metallic conduit 56 to the lower end of the heat exchanger 14. The cooled gases are shown off from the upper end of the heat exchanger 14 through the conduit 58, and are supplied to storage tank 57 through check valve 59.

Extending from the hydrogen manifold 54 are a series of metal tubes 60 which connect to the individual reaction chambers through separate check valves 62 which only permit unidirectional flow from manifold 54 to each of the reaction chambers to allow feedback flow of hydrogen or hydrogen peroxide gas carrying kinetic energy into the reaction chambers. Also the feedback paths facilitate the smooth flow of gases by passign pressure surges in the manifold back to the reaction chambers.

FIG. 2 shows a partially broken away rendition of one of the reaction chamber assemblies 21. In FIG. 2 the outer wall 64 may be formed of stainless steel or aluminum, and centrally mounted within the reaction chamber is a gas discharge tube 66. This gas discharge tube may for example be a mercury vapor tube, but other gas discharge devices including sodium vapor or other known elements could be employed. When the gas discharge devices are in the order of three feet in length, the envelope would be approximately one-half inch in diameter; and when longer units such as four or five foot units are employed, a larger diameter such as one inch might be employed for the discharge device 66. Surrounding the gas discharge device 66 is a slotted stainless steel cylinder 68. Around the outside of the stainless steel member 68, are a plurality of longitudinally extending cylindrical structures 70 which are useful in converting the relatively lower frequency radiation from the gas discharge tube 66, to flood the interior of the reaction chamber, between the wall 64 and the elements 70, with high intensity ultraviolet radiation. The cylindrical elements 70 may be in one of several forms, as discussed hereinbelow.

FIG. 3 is a cross-sectional view taken along lines III—III of FIG. 2, and FIG. 4 is an enlarged cross-sectional view showing one of the elements 70 and its association with the slotted cylinder 68 in greater detail. As shown in FIG. 3, the central gas discharge tube 66 is spaced from the enclosing slotted stainless steel cylinder 68, and the longitudinally extending members 70 are mounted adjacent the successive slots 72 in the element 68. As shown in greater detail in FIG. 4, the rods 70 may be of laser material such as suitably doped aluminum oxide, used in the ruby laser, or other known laser materials. To enhance laser action, and the generation of harmonic frequencies, the outer surface of the cylindrical laser member 74 may be coated with a film 76 of aluminum or other suitable material having high reflection at visible wavelengths but low reflectance and high transmissivity for frequencies in the ultraviolet spectrum. For completeness, FIG. 9 shows these properties for an evaporated film of silver and of aluminum. The plots of FIG. 9 are from an article in the Physical Review, Volume 55, page 1064, 1939, authored by J. B. Sabine. The film 76 is removed from that portion of the cylinder 74 which is mounted immediately adjacent the slot 72, so that pumping radiation may readily be received by the laser material 74 from the gas discharge pumping source.

Concerning the mode of operation of the laser elements 70, the diameter of the rods 74 is preferably an even multiple of half wavelengths at the lasing output frequency of the material which is employed. In this connection, the fundamental radiation wavelength of a ruby laser is just under 7000 angstrom units. As shown in FIG. 9, the aluminum layer would reflect substantially all of this fundamental frequency. However, at frequencies above the fourth harmonic (wavelength equal to approximately 1,750 angstrom units), the reflectance of the aluminum layer decreases rapidly, so that the radiation of the higher harmonics of the fundamental lasing output will be greatly enhanced.

In place of the laser rods 70, the frequency of the radiation transmitted into the reaction chamber portion of the system may be raised through the use of resonators 82 as shown in FIG. 5. The cylindrical resonators 82 are spaced around the slotted cylinder 68 and are located to receive radiation from the gas discharge tube through the slots 72. The structure of the resonator 82 includes three stainless steel elements 84, 86 and 88 which together make up the greater portion of a cylinder which effectively has a first slot 90 facing the slot 72 to permit the entry of radiation into the resonator 82, and additional output slots 92 and 94. Enclosing the greater portion of the stainless steel sections 84, 86 and 88, is the partial cylinder 96, which may be made of a suitable material having high transmission qualities for ultraviolet radiation, and good high temperature strength. One such material is aluminum oxide sold under the trademark "MACOR" by Corning Glass Company. The portion of the cylinder 96 near the slots 72 and 90, is cut away to permit direct juxtaposition of the slot 90 with the slot 72. On the inner surface of the plastic cylinder 96 is a very thin metal coating 98 of material which is reflective to visible light, but which transmits ultraviolet radiation, so that the reaction chamber may be irradiated by ultraviolet radiation through the slots 92 and 94. Although the metal coating 98 need only be at the location where the slots 92 and 94 are present, for convenience, the major portion of the internal surface of the plastic cylinder 96 may be so coated.

Instead of using the cylinder 96 of insulating material, sheet silver may be rolled down to a few Angstroms in thickness, secured across the slots 92, and the aluminum layer may be vapor deposited on to the roller silver substrate.

The mechanism by which the relatively lower frequencies entering the resonator 82 with its highly reflecting sidewalls becomes converted to high frequency ultraviolet radiation which passes through the slots 92 and 94 is relatively complex. It involves the absorption of more and more energy into the resonator 82 until finally, when very high levels of energy storage obtain within chamber 82, frequency conversion takes place, and the resultant higher frequencies are gated or "dumped" through the selective transmission windows 98. More precise mathematical analysis becomes somewhat complicated, but may be accomplished by treating the resonator as an "infinite square well potential" phenomenon. In a more simplistic manner, and as mentioned above, the resonator may be analogized to a kiln or other heat sink, which, as more and more energy is supplied to it, gradually increases in its output radiation frequencies. Thus, when heat is initially supplied to a furnace, the furnace gets hot, reaches the infrared range, and a dull red heat, then increases to white heat, and finally at very high temperatures after much additional heat has been supplied to it, reaches the higher blue heat temperature range. Similarly, as more and more energy is supplied to the resonator 82, it eventually reaches a very high energy level at which the generated ultraviolet radiation is "dumped" out through the slots 92 and the ultraviolet frequency transmissive windows 98.

FIGS. 6 and 7 illustrate one arrangement for mounting the resonators 82 about the gas discharge tube 66 and the slotted stainless steel cylinder 68, for use with the system of FIG. 1. In the arrangement of FIG. 6, only 10 cylinders are employed to enclose the slotted sleeve 68, whereas in the arrangement of FIG. 2, 12 cylinders were employed. Of course, either the laser rods, or the passive resonators may be employed in either the arrangement of FIG. 6 or the arrangement of FIG. 2.

The arrangements for supporting the three stainless steel elements 84, 86 and 88 which form a principal part of the resonator 82, are shown in FIGS. 6 and 7. With reference to FIG. 7, it may be noted that plugs 102 having an outer diameter equal to the inner diameter of the resonator are employed at each end of each of the resonator assemblies. The plugs 102 are provided with an orientation extension 104 which fits into corresponding recesses 106 in the resonator mounting block 108. In practice, the plugs 102 may be provided with protrusions or pins 110 aligned with the orientation extensions 104, to properly align the elements 84, 86 and 88, with the slot 90 as shown in FIG. 5 adjacent the slot 72 in the stainless steel cylinder 68. Following assembly of the three elements 84, 86 and 88 to the plugs 102, the cylinder 96 with its inner layer 98 may be slid over the assembly, with the slot 90 between elements 84 and 88 left exposed, and the entire assembly may be mounted as shown in FIG. 6.

Incidentally, the hollow insulating elements which are employed in the mounting of the gas discharge tubes at each end thereof, (see elements 112 and 114), for example, should be made of high quality insulating material of good mechanical strength, such as Macor ceramic, available from Corning Glass Company. The gas discharge tubes are preferably mercury arc discharge tubes of the type available from the "Volt Arc" Company.

FIG. 8 shows another alternative arrangement to implement a passive resonator structure between the outer wall 65 of the reaction chamber and the gas discharge tube 66 at its center. More specifically, in FIG. 8, a plastic cylinder 116 is provided with a heavy coating of reflecting material 118 on its inner surface, whereby a passive resonator is formed immediately around the gas discharge tube 66. At spaced intervals around the inner surface of the cylinder 116 there are provided zones 120 where the only reflecting coating is a very thin layer of aluminum or other selective transmission coating of the type discussed hereinabove with reference to other figures of the drawings and in connection with the plot of FIG. 9. By way of example, the inner reflecting layer 118 may be made up of an initial coating on the inner surface of the cylinder 116 of aluminum; and then after masking the areas 120, a heavy coating of chromium or other uniform high reflectivity coating may be superposed on the inner surface. Then, the resonator would have the advantage of very high reflectivity throughout the visible spectrum and on into the ultraviolet except at the areas 120, and then generated higher frequency radiation is transmitted through the slots or regions 120 in the far ultraviolet frequency range, as indicated by the characteristic of aluminum in FIG. 9. Of course, other suitable materials and coatings may be employed to implement the configuration shown in FIG. 8.

FIG. 9 shows plots of the percent reflectance of evaporated films of silver and aluminum, plotted against the wavelength in angstrom units. As indicated by the heavy vertical line and the arrow and legend, the visible band of frequencies extends from approximately 4,000 angstrom units, up to about 7000 angstrom units, with the color blue being at the shorter end of the wavelength spectrum, and red being at the longer end. As indicated by the plots for silver and aluminum in FIG. 9, the reflectivity of silver is very high in the visible spectrum, but drops off rapidly in the near ultraviolet band. On the other hand, aluminum has moderately high reflectance down to about 2000 angstrom units, and then, in this frequency band in the far ultraviolet, its reflectance drops off rapidly until it transmits virtually all of the incident radiation at wavelengths shorter than about 1000 angstrom units.

Figure 10:
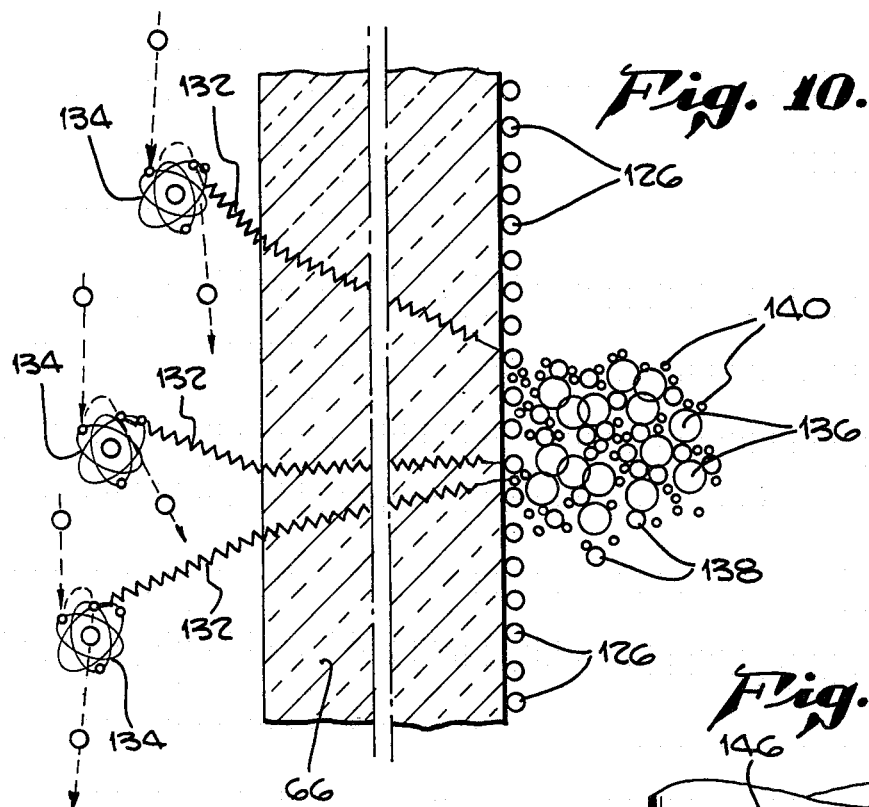
FIGS. 10, 11 and 12 are showings from the prior copending application of which this is a Continuation-In-Part.
Figure 12:
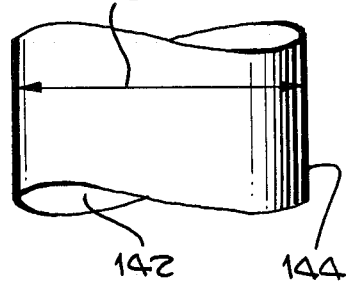
Figure 11:
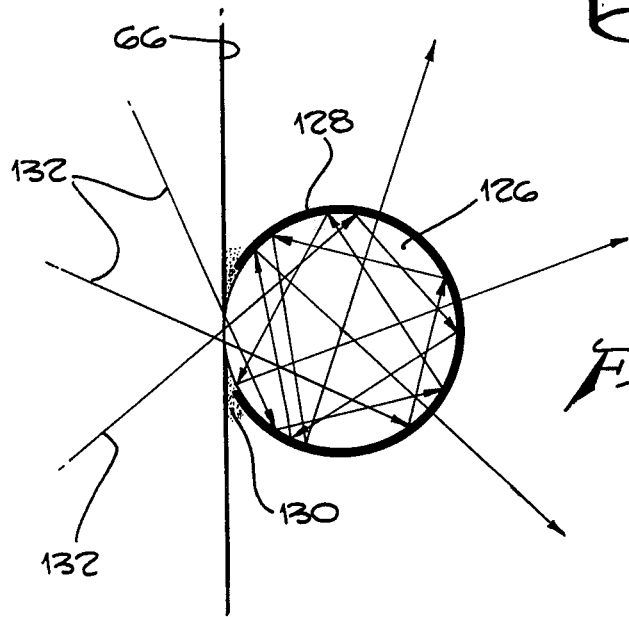

FIGS. 10, 11, and 12 are drawn from my prior U.S. patent application Ser. No. 879,226, cited hereinabove. In FIG. 10, the envelope of the gas discharge tube 66 is designated by this reference numeral, and a series of spheres 126 are mounted on its outer surface. The spheres 126 are provided with an outer reflecting coating 128 of selective transmitting material, such as an evaporated film of aluminum as discussed hereinabove, see FIG. 11. The spheres 126 are secured to the glass discharge envelope by frit 130, which is made of suitable material so that the pumping radiation 132 from the gas discharge device is not impeded in its path into the laser material 126. This phenomenon is shown more diagrammatically in FIG. 10 in which the ionized gas of molecules or atoms 134 of mercury or other suitable material are shown directing the radiations 132 through the envelope 66 and into the spheres 126. In FIG. 10 the reactant is shown on the other side of the envelope 66 and includes large molecules of water 136, smaller molecules representing atoms of oxygen 138, and the smaller circles 140 which represent hydrogen atoms or molecules. With the construction as shown in FIGS. 10 and 11, the pumping radiation from the gas discharge tube 66, which may be in the visible range, pumps the ruby laser material, aluminum oxide suitably doped, to the excited state, and laser operation is initiated. With substantially total reflection from the outer coating 128 in the visible spectrum where a ruby laser normally operates, higher harmonics will be generated and harmonics such as the fifth or higher will be readily transmitted through the aluminum coating 128 and radiate into the reaction chamber surrounding the discharge tube 66. This dissociates water vapor molecules such as those indicated at 136 in FIG. 10 to form hydrogen gas and oxygen, which recombine to form hydrogen peroxide in many cases. FIG. 12 is a greatly enlarged showing of a filament of 142 of laser material provided with an outer coating 144 of suitable reflecting qualities such as aluminum, as shown in FIG. 9.

As in the case of other embodiments employing laser material, the distance 146 between reflecting surfaces should be an integral number of half wave lengths at the lazing frequency of the laser material This would of course also be true of the diameter of the spheres 126 of FIGS. 10 and 11. Also, the output radiation from the filament 142 of FIG. 12 would primarily be in the far ultraviolet frequency region.

Now that the basic structure of the present apparatus has been described, certain background and associated information will be set forth. In this connection and by way of background, attention is directed to the May 1979 Scientific American, in which the article entitled, "Laser Chemistry" starting on page 114 and extending through page 128 is noted.

Figure 13:
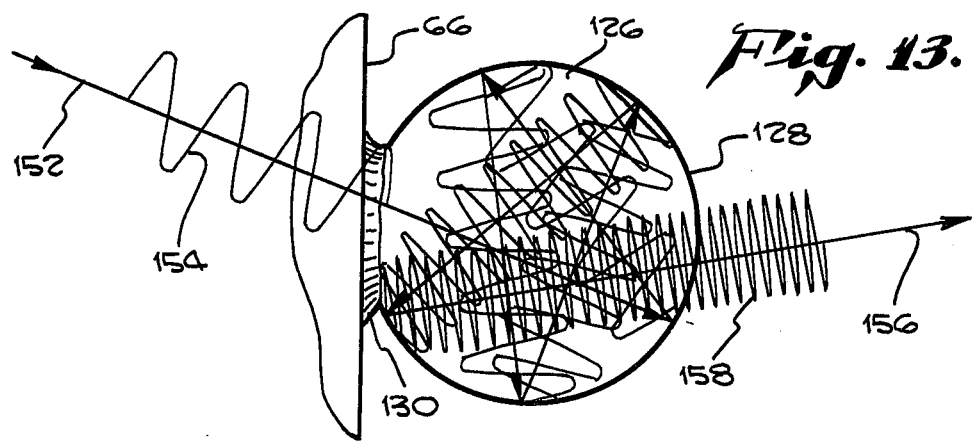
FIG. 13 is an alternative showing of a gas discharge device to which a coated laser element is attached.

FIG. 13 is a showing similar to that of FIG. 12, but with the packets of incident waves shown in more diagrammatic manner. Specifically, the radiation from the discharge tube within the envelope 66 is represented by the line 152 and the superposed relatively low frequency sine wave 154 associated therewith. The laser sphere 126 is provided with an outer coating of copper 128 which substantially fully reflects relatively low frequencies such as the incoming wave 152. However, after repeated reflection from the surface 128, harmonic energy is generated and this higher frequency energy is radiated out through the coating 128 as indicated by the arrow 156 and the associated higher frequency sine wave 158.

Figure 14:
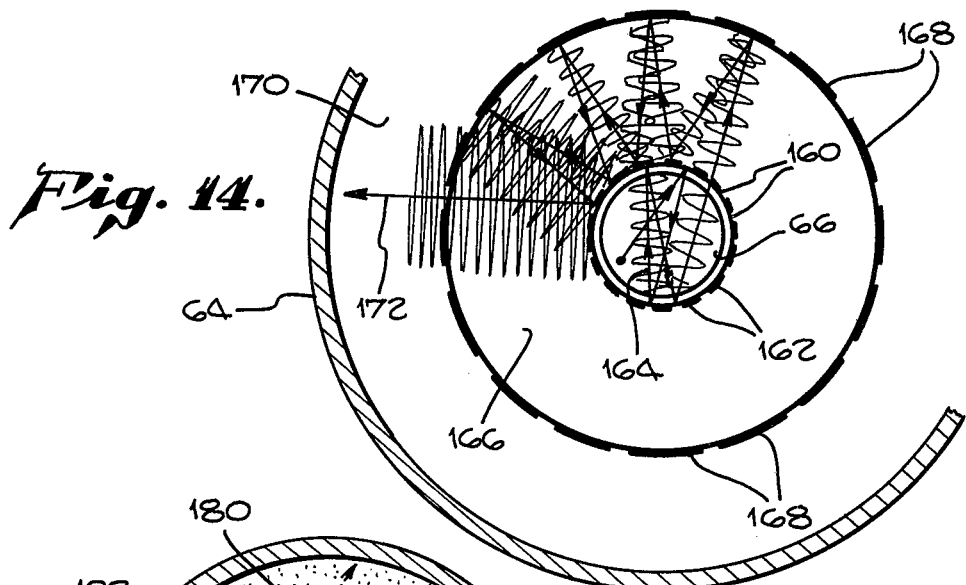
FIG. 14 shows an alternate simplified arrangement for generating ultraviolet radiation to supply to a reaction chamber enclosing a discharge tube.

FIG. 14 shows an alternative arrangement of passive resonator for use with the gas discharge tube 66 and the reaction chamber 64, as shown in FIG. 2. More specifically, FIG. 14 shows a thin coating 160 directly on the outer surface of the quartz envelope for the gas discharge tube 66. This coating 160 is of the high frequency transmissive type such as the aluminum layer, the characteristic of which is shown in FIG. 9 of the drawings. In addition, a thicker coating 162 of a fully reflecting metal is laid down on top of the coating 160, but with slots permitting radiation to pass through at a number of points around the periphery of the tube 66. On the other hand, even when radiation passes through the layer 160, if it is in the vicinity of the thicker fully reflecting layer elements 162, it cannot pass through, but is reflected back into the space within the discharge tubes 66. Finally, after numerous reflections within the gas discharge envelope 66, as indicated by the characteristics 164, certain higher frequency radiations which have been generated pass through one of the slots in the layer 162 and enter the space 166 between the coated envelope 66 and the peripherally extending slotted conductor 168 interposed radially between the central discharge tube and the main reaction chamber region 170. The purpose of the slotted reflector 168 is to cause further reflections back and forth within the region 166, finally permitting even higher frequencies, having correspondingly more energetic photons, as indicated by the wave packet 172, to pass out into the reaction zone 170.

Figure 15:
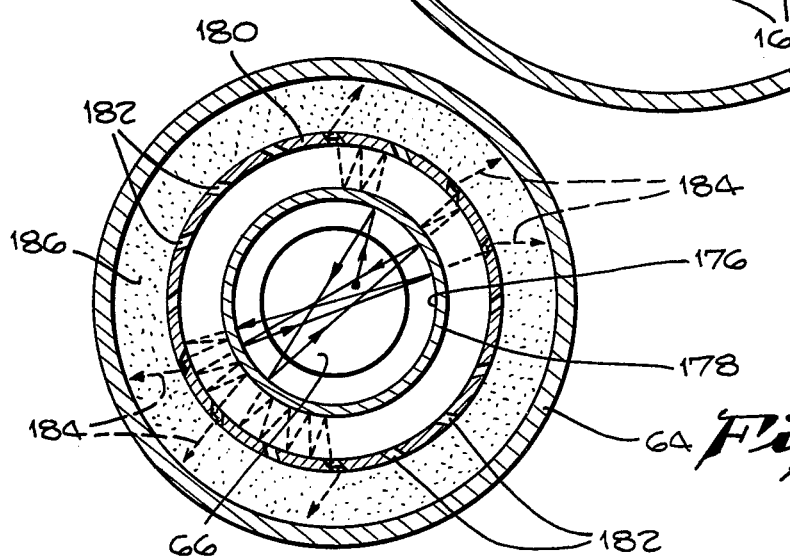
FIG. 15 is a view of a further alternative arrangement in which ultraviolet radiation is generated by an arrangement which includes successive concentric elements.

FIG. 15 shows a somewhat different structure following similar principles as the arrangements of FIG. 14 and certain earlier embodiments of the invention. In FIG. 15, between the centrally located gaseous discharge tubes 66 and the outer walls 64 of the reaction chamber, are included the quartz or aluminum oxide tube 176 which is coated with a thin aluminum layer 178, and the reflecting heavy metal cylinder 180 which is provided with angled slots 182. The higher frequencies which pass through the aluminum coating 178 are reflected back and forth between the reflecting surface of the cylinder 180 and the layer 178, until the higher frequency radiations finally impinge on one of the slots and are transmitted through, as indicated by arrows 184, into the reaction chamber 186.

Now that the principal elements of structure which are included in the system have been described it is appropriate to mention some of the background factors which lead to the structures which have been described. Initially, in the following tables, the energy required for molecular dissociation is set forth in Table No. I, and the energy required for ionization at the lowest levels, both for atoms and molecules is set forth in Table II, as follows:

| ENERGY REQUIRED FOR MOLECULAR DISSOCIATION | |
|---|---|
| Molecule | Electron Volts (eV) |
| $H_2O_{(l)}$ | 3.06 |
| $H_2O_{(g)}$ | 2.51 |
| $H_2$ | 4.48 |
| $O_2$ | 5.12 |
| OH | 4.40 |

TABLE II

| ENERGY REQUIRED FOR INOIZATION-(FIRST-POTENTIAL), ATOMS & MOLECULES | | |
|---|---|---|
| Molecule or Atom | Electron Volts (eV) | Wavelength Angstroms |
| $H_2O_{(g)}$ | 12.600 | 984.10 |
| $HO_2$ | 11.500 | 1078.30 |
| $H_2$ | 15.420 | 804.20 |
| $O_2$ | 12.200 | 1016.40 |
| H | 13.597 | 911.96 |
| O | 13.617 | 910.62 |
| OH | 13.200 | 939.40 |

From Table II it is evident that, for the ionization of a molecule of water vapor by a single photon, it is necessary that it have a wavelength less than 984.1 angstroms, or a higher frequency. At lesser energy levels involving longer wavelengths and lower frequencies, multi-photon absorption is required for the ionization of water vapor. Further, if a single molecule vapor is hit with a large number of high energy photons in a short period of time, even where each of the photons could have ionized the molecule by itself, the energy may still be absorbed by the molecule with the result that highly energetic output products are produced.

In the present system as shown in FIG. 1, each of the mercury vapor arc lamps is capable of emitting approximately 10,000 joules of radiated energy, and the set of six therefore produces the order of 60,000 joules. For mercury vapor, this energy is emitted in the form of 13 principal spectral lines. While other fainter or weaker output frequencies are present, these 13 principal lines are more important ones and were accepted for design calculations. None of these radiations are acceptably effective at the wavelength as emitted, as they do not couple strongly with the absorption bands of water vapor and are accordingly relatively ineffective. In the present examples, the wavelengths are compressed, on the average, to about 25% of the normal emissions. Of course, the corresponding increase of the frequencies is approximately 400%.

The wave compression is accomplished within the passive resonators by restraining and containing all input radiation within the resonator cavities until the compression level reaches the design point at which all the radiation energy contained in the resonator cavities is "dumped" automatically in an action called "cavity-dumping".

The energy emitted by the resonators, except for some heat losses, is nominally the same amount of energy which entered the resonators. Of course, the characteristics are entirely different, and the differences may be studied by comparing Tables III and IV set forth below:

TABLE III

| PUMP OUTPUT RADIATION (PUMP) H 10K/50A (VA) | | | | |
|---|---|---|---|---|
| Percent of Total | Joules (Sec) | Wavelength (A) | Energy (eV) | Photons/Sec |
| 1.40% | 839.88 | 2420 | 5.130 | $1.0219 \times 10^{21}$ |
| 1.85 | 1108.02 | 2450 | 5.067 | $1.3648 \times 10^{21}$ |
| 2.08 | 1248.00 | 2650 | 4.685 | $1.6627 \times 10^{21}$ |
| 2.77 | 1660.02 | 2580 | 4.812 | $2.1533 \times 10^{21}$ |
| 1.85 | 1108.02 | 2800 | 4.434 | $1.5598 \times 10^{21}$ |
| 2.77 | 1660.02 | 2980 | 4.166 | $2.4871 \times 10^{21}$ |
| 3.46 | 2076.00 | 3050 | 4.070 | $3.1834 \times 10^{21}$ |
| 7.85 | 4708.02 | 3120 | 3.979 | $7.3848 \times 10^{21}$ |
| 1.39 | 832.02 | 3340 | 3.717 | $1.3972 \times 10^{21}$ |
| 18.48 | 11,088.00 | 3675 | 3.378 | $2.0487 \times 10^{22}$ |
| 18.48 | 11,088.00 | 4475 | 2.774 | $2.0487 \times 10^{22}$ |
| 23.08 | 13,843.00 | 5760 | 2.155 | $4.0104 \times 10^{22}$ |
| 14.56 | 8,736.00 | 10,150 | 1.220 | $4.4592 \times 10^{22}$ |
| 100.00% | 60,000.00 | | 49.587 | $1.5234 \times 10^{23}$ |

TABLE IV

| RESONATOR OUTPUT RADIATIONS (TYPICAL) | | | | |
|---|---|---|---|---|
| Percent of Total | Joules (Sec) | Wavelength (A) | Energy (eV) | n-Photons (Sec) |
| 10.0 | 6000 | 600 | 20.69 | $1.80 \times 10^{21}$ |
| 15.0 | 9000 | 800 | 15.52 | $3.62 \times 10^{21}$ |
| 20.0 | 12000 | 1100 | 11.28 | $6.63 \times 10^{21}$ |
| 55.0 | 33000 | 1500 | 8.28 | $2.49 \times 10^{22}$ |
| 1.000 | 60,000 | | 55.77 | $3.694 \times 10^{22}$ |

In considering the foregoing tables, it may be noted that the sum of the power of the 13 frequencies from the mercury vapor lamps is 60,000 joules, and the sum of the power in the four representative frequencies indicating the nature of the higher frequency radiation, is also equal to 60,000 joules. Incidentally, Table IV is derived in part from FIG. 9 and is based on the use of an aluminum film as the filter at the ouput of the resonator.

The wave compression action reduces the number of photons to about 24% or 25% of the original number of photons comprising the "pumping energy". However, ignoring the nominal heat losses from convection, the amount of energy carried by these fewer numbers of photons is still approximately equal to the 60,000 joules which were initially present. Each individual (averaged) photon leaving the resonators is carrying about 415% more (redistributed) energy than the individual photon entering the resonators. The resonators restrain the wavelengths to those wavelengths between about 600 angstroms to about 1500 angstroms. With resonators employing films having different cutoff frequencies or wavelengths, the frequency could be shifted higher, with correspondingly shorter wavelengths to reduce the wavelengths to below 200 angstroms.

A crude analogy to this optical wave compression may be found in a simple high temperature ceramic kiln as mentioned hereinabove. The heating elements are continually pumping the kiln with long-wave infrared radiation. The insulation contains the energy, and the temperatures climb upward. As the radiated infrared energy continues to irradiate the kiln interior from the heating elements, the color of the kiln interior changes from dull red, to bright cherry red, to orange-red, to orange, to yellow, to white, and finally to blue-white. These color changes reflect the "wave compression" of the radiated energy contained within the kiln cavity.

More rigorous mathematical analysis reaching the same conclusions may be accomplished using square well potential theory and Schroedinger's equation, following the approach set forth in the text entitled, "Quantum Physics of Atoms, Molecules, Solids, Nuclei, and Particles", by Robert Eisberg and Robert Resnick, copyright 1974 John Wiley & Sons, Inc., pages 226 through 239, and Appendix G, pages G1 through G6.

Incidentally, the beating together of two or more radiations, such as those of 1500 and of 1100 Angstrom units wavelength, in the presence of media discontinuities, such as the feedstock, in the reaction chamber, will produce additional higher frequency radiation, as a result of the sum and difference frequencies (particularly the sum frequencies) which are generated.

Figure 16:
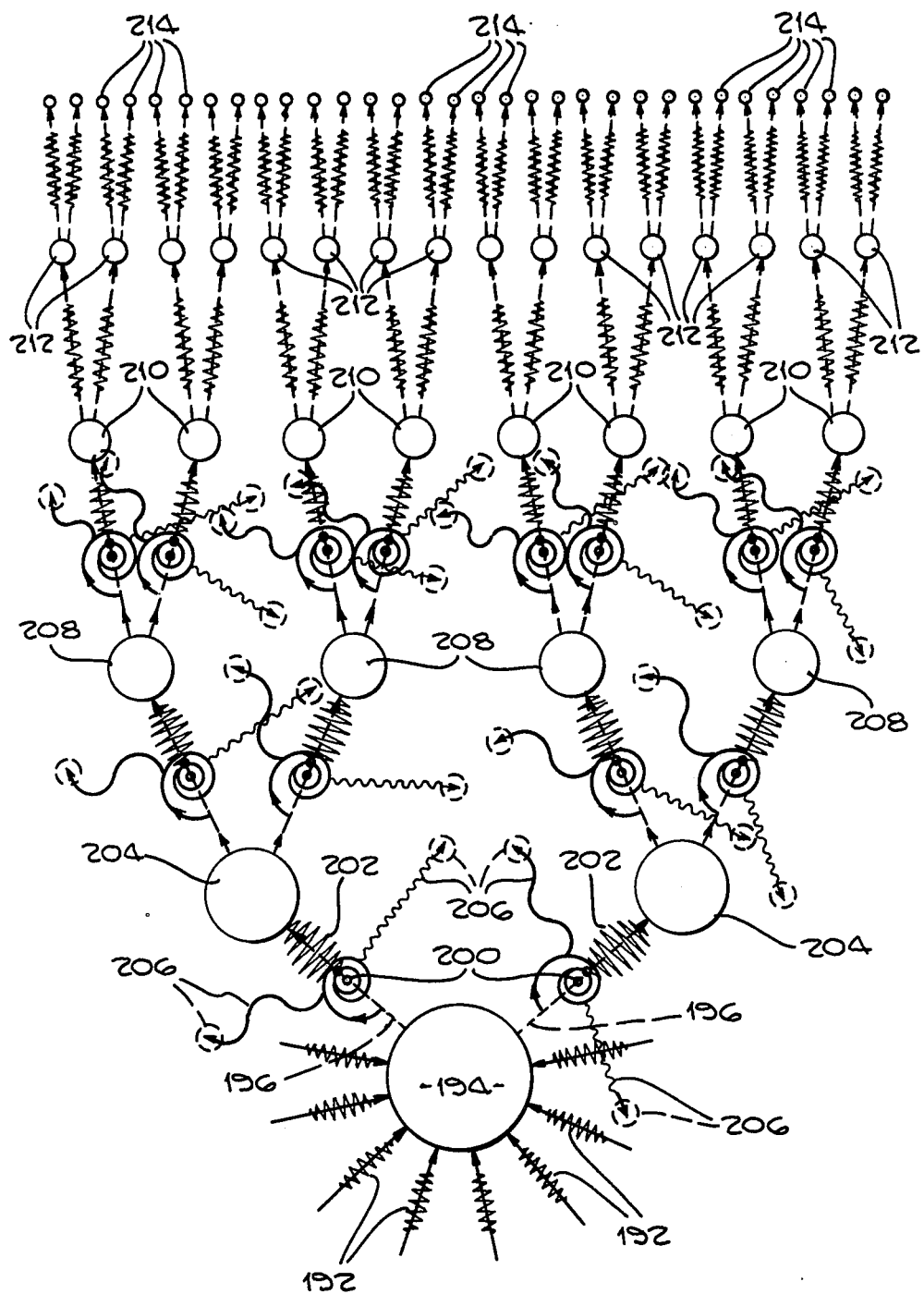
FIG. 16 is a diagrammatic showing of one illustrative chain reaction which is initiated when one water vapor molecule is impacted by several high energy photons in the systems of the present invention.

Now, returning to the drawings, FIG. 16 indicates diagrammatically some of the phenomena which occur within the reaction chamber. In connection with FIG. 16, attention is particularly directed to Table I which shows the energy required for molecular dissociation, Table II indicating the energy required for the ionization of various atoms and molecules, and Table IV which indicates the energy levels present in the high frequency radiations from the resonant chambers. It is also noted that, with the geometry employed in connection with the present structures, the water vapor supplied to the reaction chambers is flooded with very high frequency and high intensity radiation having energy content adequate for dissociation and ionization. Under these conditions, the phenomenon of "multiphoton absorption" in which a single atom or molecule absorbs a large number of photons within a short interval of time, also frequently takes place. It is also noted that the ionization reaction in each atom and molecule is surrounded, or "caged" by large numbers of un-ionized water vapor molecules so that the energy generated, both in terms of the kinetic energy of electrons and positive ions, as well as the generated photons, will impinge on these other water vapor molecules and ionize or dissociate them, in turn.

In the showing of FIG. 16, the reaction starts with the impingement of a large number of high energy photons 192 on the water vapor molecule 194 in a multiphoton absorption process involving the arrival of the photons 192 within a very short interval such that they are all absorbed by the water vapor molecule 194. Now, referring back to Table IV, we will assume, for simplicity, that all of the incident photons 192 have energy equal to 20 electron volts, making a total of 160 electron volts, which is substantially instantaneously absorbed by the water molecule 194. With only about 2.51 electron volts being required for the molecular dissociation of water vapor, and with only 12.6 electron volts being required for the ionization of the atoms and molecules of water vapor, the applied 160 electron volts will "blast" the molecular structure apart. In addition to fully dissociating and ionizing the hydrogen and oxygen atoms included in the water vapor molecule, very large amounts of kinetic energy are supplied to the resultant charged particles, including the electrons and atomic nuclei. The dashed lines 196 and 198 extending from the water vapor molecule 194 indicate the high velocity particles emanating from the original location, in this simplistic showing of FIG. 16.

The ejected electrons are instantly subject to "recapture" by any proton nucleus. In the electron-ion recombination "capture" process, the electron must go from a free (positive energy) state, to a bound (negative energy) state, and the electronic energy of the system must be reduced. Also, in a positive ion-negative ion recombination, a similar reduction in electronic energy must be achieved in order for the electron to transfer from the negative ion to the positive ion, thereby neutralizing the system. Then, in both cases, the electronic energy which is released in the course of a recombination event, must be transmitted from this location; this energy may appear in the form of electromagnetic radiation, internal modes of vibration, or rotation if molecules are involved, or translational kinetic energy of any particles participating in the capture process.

In the qualitative diagram of FIG. 16, a pair of recapture events is shown at 200 with the resultant high energy ultraviolet photon being indicated at 202, impinging on an additional pair of water vapor molecules 204, and ionizing each of them in the next step of the chain event. It may also be noted that, during the successive stages of recombination, photons of radiated energy are emitted comprised of the specific frequencies that are characteristic of the atomic structures. Such radiations are indicated by the reference numerals 206. These radiations may vary widely in their frequency and their energy content, and may include, for example, both radio frequency and infrared radiations. Through the phenomenon of multiphoton absorption, many of these radiations will impinge on other molecules or atoms substantially simultaneously with other incident radiations on the same molecule or atom, and cause dissociation or ionization through this multiphoton absorption process.

Successive additional steps of ionization of further water vapor molecules is indicated, going from the bottom to the top of FIG. 16, by the row of four water vapor molecules 208 in the third level, and in the row of eight water vapor molecules 210 in the fourth stage.

Quantum Physics indicates that the captured electrons in each case can have only discrete energies corresponding to atomic energy levels detailed in the technical literature. As the newly bound electrons seek the lowest energy level, the successive downward transitions release precise quantized packets of radiations as photons, with clearly defined spectral lines that are superposed at precise frequencies on the spectrum of continuous radiation. The downward cascade of the captured electron, within the quantized ladder of bound energy levels, leads first to the emission of extremely long wavelengths from levels high within the atom. Then, infrared radiation is emitted. This is followed by visible and an abundance of ultraviolet radiation of very short wavelengths.

Returning to FIG. 16, by the time that the photons strike the eight water vapor molecules 210, the energy level is insufficient for ionization, so the phenomenon merely involves dissociation at the two upper levels, where the sixteen water vapor molecules are designated by the reference numeral 212, and the final thirty-two reaction products by the reference numeral 214.

In the diagram of FIG. 16, thirty-three water vapor molecules have been dissociated. Further, this all originated with a single molecule 194 which was powerfully and energetically ionized by the original incident packets of high frequency energy.

Some of the points to be noted from the diagram of FIG. 16 are first, that merely because a number of photons are absorbed by a single water vapor molecule, this does not mean that the excess energy is lost. Instead, this excess energy is re-radiated and utilized in further dissociation and ionization reactions. Secondly, the very high intensity levels of radiation which are present in the reaction chambers of the invention contributes to the multiphoton ionization and dissociation which in some cases over-excites molecules; and in other cases, when the individual photons could not dissociate or ionize alone, the convergence of several photons on the single molecule or atom will cause such action. In addition, the moderately high concentration of water vapor molecules will "cage" the radiation which occurs immediately adjacent the sources of radiant energy, so that the excess energies are appropriately utilized.

Turning to another phase of the invention, it is important to note that the chain reaction mechanism is initiated by radiation supplied from the central discharge tubes, outside of the reaction chamber per se. This input of primary radiation can be supplied either continuously or in a pulsed sequence according to design. Either continuous or pulsed radiation of appropriate wavelength as input to the reaction chamber will initiate large numbers of working chains. As indicated in FIG. 16, product atoms and molecules carry away both internal and kinetic energy. These "excited atoms", both hydrogen and oxygen, can be manipulated, quenched, controlled, or combined into desirable product molecules.

Incidentally, returning to FIG. 1, the system is designed to minimize the size of the electrical component associated with the unit by energizing the mercury vapor tubes associated with the successive reaction chambers sequentially, for discrete intervals. At present, a duty cycle for each tube of one second is contemplated with the successive tubes being fired in order, and the initial tube being energized for another one second interval, every six seconds.

Returning now to the Figures of the drawings, FIGS. 17 through 21 of the drawings show a further alternative arrangement. More specifically, with reference to FIG. 17, this diagram is a simplistic showing of the use of a series of three apertured conductive members 232, 234 and 236, with the screens 232 and 234 defining a first resonator therebetween, and the screens 234 and 236 defining a second resonator. In addition, associated with each of the screens 234 and 236 would be a high frequency short length wave filter element for permitting the transmission of very high frequencies in the ultra violet band but not frequencies in the visible or near ultraviolet frequency bands.

In the schematic showing of FIG. 17, radiation from the discharge lamp is indicated as arriving at arrow 238, and this would be longer wavelength and lower frequency energy. Following processing in the two resonators and passing through the high frequency transmission filters associated with the reflecting surfaces 234 and 236, high frequency and high intensity ultraviolet radiation is transmitted into the reaction chamber as indicated by the arrow 240. FIG. 18 is a more accurate view of the perforated screen which would make up each of the reflectors 232, 234 and 236. It could, for example, be made of a relatively thick self supporting layer of aluminum, stainless steel, or other high reflectivity materials.

FIG. 19 is a greatly enlarged cross-sectional view of the screen 234 showing the solid portion 242 and one of the many holes or apertures 244. The filter for permitting the transmission of far ultraviolet radiations and for reflecting visible light and near ultraviolet radiations may take the form of a two-layer film including a substrate 246 of rolled silver and a vapor deposited coating of aluminum 248, which is applied to the thin rolled layer 246 of siler after it is secured in place on the screen 234 by epoxy glue or the like. The silver layer is rolled very thin in a manner similar to gold leaf, and may be only a few angstrom units thick. With reference to FIG. 9 of the drawings, it may be noted that the silver layer will transmit most ultraviolet radiations shorter than about 3100 Angstroms; however, the aluminum layer does not transmit significant amounts of radiation until the wavelength is significantly shorter than 2000 Angstroms, and then transmits freely below 1000 Angstroms. Accordingly, the use of the very thin rolled silver layer for support of the vapor deposited aluminum layer 248 is a convenient technique for obtaining the desired transmission qualities. In addition, the diagram of FIG. 19 may represent other earlier embodiments of the invention described hereinabove in which 244 would be a slot in one of the cylindrical members 242, and the laminated film 246, 248 would cover these slots.

FIGS. 20 and 21 indicate diagrammatically the incorporation of the three reflecting surfaces 232, 234 and 238 into a structure enclosing a gas discharge device 252 and providing high frequency radiation as indicated by the arrow 240 into the outer reaction chambers shown in the earlier embodiments of the invention.

GENERAL CONSIDERATIONS

Any oscillator can be turned into an amplifier by providing a suitable type of feedback. In the present oscillator/resonator, "feedback" is provided by means of highly reflective mirrored surfaces at both ends of an optical path traversing the oscillator cavity. The energy that starts the oscillation enters the cavity through the optical windows facing the gas discharge device in the arrangements of FIGS. 14 and 15 for example. FIGS. 17 through 21 show alternative similar structures using apertures instead of slots.

The end mirrored surfaces of a resonator "define" a resonator, and, existing in all resonators are normal modes or resonances ... field configurations that represent "energy storage within the resonator", and are self-sustaining with the resonator for relatively long periods of time. The modes of an optical resonator are similar to those of a microwave resonator in that they represent configurations of the electromagnetic field that are determined by boundary conditions.

It is common to speak of the configuration in the X, Y, directions as the spatial or transverse mode configuration, and quite independently to speak of the Z direction as the longitudinal or temporal mode configuration. In the arrangements disclosed herein, the "Z" direction is radial, perpendicular to the windows and the reflecting walls.

For simplicity we will drop the use of the word "configuration" when speaking further of the resonator modes.

The frequencies at which temporal modes can occur are set by the boundary conditions at the reflective surfaces, which determine that oscillation can occur only when there are an integral number of half-wavelength between the reflective surfaces. A basic characteristic of the modes of any resonator is, that they represent energy storage within the resonator as noted earlier.

The resonators disclosed herein are (by design) short in the Z direction, unlike normal commercial resonators, also, as compared to the X and Y directions. Short oscillators offer an advantage in that the normal mode separation is quite large, in fact larger than the mean width of the Doppler profile. In this case, stable oscillation in a single mode can be achieved even though the cavity gain is considerably above threshold. Additionally, on an absolute basis, a short resonator/oscillator will experience less distortions per given thermal or mechanical disturbance than a long one. The only known major disadvantage of the short resonator is that its gain per pass is less.

In the design of short lasers for single-frequency operation, the length of the resonator/oscillator must be dictated by the Doppler width, as well as gain available and other less important considerations.

The short "Z" as used in the present arrangements does not result in (or create) modified energy distribution by diffraction effects as is the case (normally) with long "Z". Near-field and far-field distribution remain the same with short "Z" distance.

In a mode denoted by the notation TEM$_{mnq}$, the number "q" denoted the nodes in the electric field between the end reflective surfaces. The number of half-wavelengths in the resonator is then either q or q plus 1, depending in detail on the spatial mode for normal resonators.

If q' is an integer that denotes either q or q plus 1, as appropriate, then the wavelength of the oscillation is given by $$\lambda = 2L/q' \quad (1)$$

and the frequency is therefore given by $$\nu = cq'/2L \quad (2)$$

The frequency separation between Modes corresponding to q' and q'+1 is therefore given by $$\Delta\nu = C/2L \quad (3)$$

where C is the mean speed of light in the medium and L is the length of the optical path between the reflective surfaces.

When the optical path between the reflective surfaces traverses solids as in solid lasers, L becomes an "effective length" by taking into account possible wavelength changes because of refractive index effects. The quantity C/2L, is therefore fundamental to many details of oscillator operation. Incidently, it is also the inverse of the time required for a radiated signal to travel a complete round trip through the oscillator (or resonator), starting through the entry opening and bouncing between the two reflective surfaces.

When a resonator/oscillator is functioning in many spatial modes as well as in several temporal modes, then the frequency allocations of the various modes become much more complex, and will not be treated here.

The accumulated energy is coupled out of the resonator cavity at the desired wavelength/frequency by providing output reflective (mirrors) with transmission T, that is reflective at the optical pump input frequencies and transmitting at the desired output frequencies, as discussed to some extent hereinabove in connection with FIG. 9. This fundamental characteristic can be "predetermined by design", can be structured by means of "narrow band-pass reflectors", which can be produced by the layered combination of suitable materials in discrete multi-element (or multi-compound) assemblies with appropriate thicknesses and stack positions.

The "CAVITY DUMPING SYSTEM" of the present invention can best be described by comparing it to a well-known laser system called "PULSE-TRANSMISSION MODE Q-SWITCHING", which is a means for generating extremely short (time) Q-switched laser pulses by Q-switching a laser with 100 percent reflective mirrors on both ends of the oscillator cavity, and then at the peak of the stored accumulation of energy, rapidly switching the output mirror from 100 percent to a very low percent reflection, or high transmission. This allows a very rapid dumping of the accumulated optical energy from within the cavity.

The present apparatus (like most lasers), uses electrical energy as a source for power. The electrical energy is converted into radiation by means of conventional noble gas, metal vapor discharge lamps or special filament lamps. The selection and use of a particular lamp (pump) is controlled by the type of emissions desired and whether the lamp or pump driver will be operated in a continuous or pulsed mode. The discharge lamps employed in the implementation of the present invention operate at modest current densities and represent a compromise between a monochromatic source and a black body source such as filaments.

The apparatus of the present invention is so structured that all the diverse input wavelengths are combined into a relatively monochromatic narrow band of ultraviolet frequencies. The lamps or optical pumps must be structured of suitable materials so that the lamp envelope is transparent to the desired wavelengths of radiated energy. Available envelope materials (and expense) places very limited parameters on the transmission characteristics of the lamps.

Different materials must be used to make lamp envelopes for different desired wavelength emissions, because the transparency of the available materials to the radiated energy varies from wavelength to wavelength. Glass transmits radiation (light) in the visible region; however, quartz (SiO$_2$) must be used on the ultraviolet side of the visible spectrum. For practical purposes, quartz is opaque to wavelength much shorter than 2,000 Angstroms, and must be replaced by very expensive SUPRASIL brand quality quartz, which is a very superior grade quartz that does transmit extremely well at 1 mm thickness at 1700 angstroms (85 percent).

Calcium Fluoride (CaF2) may be used (at considerable expense), which transmits well at 1600 Angstroms. Many attempts have been made to find other materials (such as sapphire tubing) to extend the transmission much further down into the vacuum ultraviolet range, which are practical for lamp manufacturing in large quantities and sizes as well as being practical from an economic point of view. No acceptable materials have emerged.

For the purposes of the present invention, we are interested (principally) in the wavelengths from 1,000 down to about 500 Angstroms, with nothing longer than 1500 Angstroms.

Since the commercial lamps that operate as optical pumps actually emit lower frequency broad-band radiation by comparison to both lasers and the desired output frequencies for the present invention, we must "accept" these multiple spectral lines into our resonator, combine the multiple spectral lines into a narrow band of substantially monochromatic radiation and then by means of our cavity-dumping system, build up the energy-frequency relationship which shortens the wavelength before we dump the energy from the cavity.

This frequency conversion is a continuous and progressive operation which requires a nominal part of a second for conversion of a photon. It occurs inside a sealed reaction chamber and floods the reaction chamber (photochemical) with large amounts of powerful radiation at selected, predetermined spectral bands.

FREQUENCY/WAVELENGTH/ENERGY RELATIONSHIPS

All electromagnetic radiation can be characterized by its particular wavelength, lambda, $\lambda$ (measured in meters, centimeters, or Angstrom units), or by its wavenumber, nu, $\nu$ (the reciprocal of the wavelength, $\nu = 1/\lambda$, commonly expressed in reciprocal centimeters, $1/cm$, or $cm^{-1}$).

Each unit of radiation (a photon) corresponds to a QUANTUM of radiant energy, E, which is directly proportional to the wavenumber, $\nu$. Since chemical calculations are founded on a MOLE basis, when considering the relationship between radiant energy and chemical processes it is convenient to express radiant energy in Kcal/mole of photons, or Kcal/einstein.

We can do this according to a simple relationship: the radiant energy in 1 mole of photons, with $\nu = 350 \, cm^{-1}$, is equal to 1 Kcal.

The derivation of the above simple relationship proceeds as follows:

The energy of a photon with a given wavenumber, $\nu$, is given by the expression:

$$E = h \times c \times \nu \qquad (4)$$

In this expression, h is Planck's constant $h = 6.62 \times 10^{-27} \, erg \times sec$) and c is the velocity of light ($c = 3.00 \times 10^{10}$ cm/sec), and $\nu$ is expressed in $cm^{-1}$. Therefore, the quantum of energy corresponding to a photon of a given wavenumber is:

$$E = 6.62 \times 10^{-27} \, erg \times sec \times 3.00 \times 10^{10} cm/sec \times \qquad (5)$$
$$\nu \, cm^{-1} = 1.99 \times 10^{-16} \times \nu \, erg$$

We can express this quantum of energy in the Kcal units by using the conversion factor 1 erg = $2.39 \times 10^{-11}$ kcal, as follows:

$$E = 1.99 \times 10^{-16} \times \nu \, erg \times 2.39 \times 10^{-11} \, kcal/erg = \qquad (6)$$
$$4.75 \times 10^{-27} \times \nu \, kcal$$

and the energy in 1 mole of photons ($6.023 \times 10^{23}$ photons) is:

$$E = 6.023 \times 10^{23} \times 4.75 \times 10^{-27} \times \nu \, kcal/mole \qquad (7)$$
$$E = 2.86 \times 10^{-3} \times \nu \, kcal/mole = (\nu/350) \, kcal/mole \qquad (8)$$

The conversion factor between $cm^{-1}$ and kcal/mole is:

$$350 \, cm^{-1} = kcal/mole \text{ (of photons)} \qquad (9)$$

As an example, the energy of photons with $\nu = 20,000 \, cm^{-1}$ is:

$$E = 20,000 \, cm^{-1} \times \frac{1 \, kcal/mole \, of \, photons}{350 \, cm^{-1}} = \qquad (10)$$
$$57.1 \, kcal/mole \, of \, photons \, (OR) \, 57.1 \, kcal/einstein$$

And the energy of a single photon of $\nu = 20,000 \, cm^{-1}$:

$$E_{1.0 \, photon} = \frac{57.1 \, Kcal \, einstein}{6.023 \times 10^{23} \, photons/mole \, of \, photons} \qquad (11)$$
$$E_{1.0 \, photon} = 9.48 \times 10^{-23} \, Kcal/einstein \qquad (12)$$

Further, physicists normally think in terms of "electron-volts," eV, which is defined as the amount of energy equal to the change in energy of one electronic charge when it moves through a potential difference of one volt. Since the electron-volt is an energy unit, it is in the same category as the foot-pound, the British thermal unit, and the kilowatt-hour.

Energies in joules can be converted to electron-volts when divided by $e_c = 1.60 \times 10^{-19}$. In this case (only), the $e_c$ is not a charge but is a conversion factor having the units of joules per electron-volt.

It is quite convenient to express photon energies in electron-volts. As an example, we will calculate the energy of 1200 A radiation expressed in electron-volts.

$$E = h\nu = \frac{hc}{\lambda} = \qquad (13)$$
$$\frac{6.6262 \times 10^{-34} joules\text{-}sec \times 3.00 \times 10^8 \, m\text{-}sec}{1.20 \times 10^{-7} \, m \, (1200 \, A)}$$
$$= \frac{1.98786 \times 10^{-25}}{1.20 \times 10^{-7} \, m}$$
$$= 1.65655 \times 10^{-18} \, (J)$$

Then, converting from joules to electron-volts:

$$\frac{1.65655 \times 10^{-18} \, (J)}{1.60 \times 10^{-19} \, (J)} = 10.35 \, eV \, (1200 \, A) \qquad (14)$$

In the illustrative embodiments of the invention, radiated energy is accepted from the optical pump in all of the different wavelengths which the pump emits. As an example, the pump H15K/77A (mercury vapor) emits 13 different wavelengths that vary from 2420 A to about 10,150 A., and these were set forth in Table III.

As mentioned above, the "wave-compression" is accomplished in the resonators where electromagnetic fields can exist whose distributions of amplitudes and phases reproduce themselves upon repeated reflections between mirrored surfaces. These particular electromagnetic field configurations comprise the transverse modes of a passive resonator. The "wave-compression" was calculated by means of Schroedinger equations involving the Infinite Square-well Potential.

The "INFINITE SQUARE WELL POTENTIAL" analysis approach is often used in quantum mechanics to represent a condition in which a particle-wave duality moves in a restricted region of space under the influence of forces which hold it in that region. Although this simplistic potential loses some details of the motion, it retains the essential feature, which is binding a wave-particle to a region of a certain size, by means of forces of certain characteristics. The resonators employed in the present systems, with their output filter are clearly analogous to the physical systems which have previously been analyzed using the square well potential approach.

The resonator cavities are designed to restrain and retain the input radiation by means of repeated reflections and replications, through a period of wavelength compression. This compression of the wavelength occurs during the "energy (radiated) input period". An accurate analogy is well-known and proven, termed MULTIPHOTON ABSORPTION. This method and means, of raising the energy level of a molecule or atom, within the very limited time parameter of less than $10^{-8}$ second, also raises the frequency in direct relationship with the increase in energy. In other words, the higher the energy, the more numerous are the oscillations and the higher is the wavenumber.

The quantum mechanical probability density oscillates more and more as "n" increases. In the limit that "n" approaches infinity, that is for eigenvalues of very high energy, the oscillations are so compressed that no experiment could possibly have the resolution to observe anything other than the average behavior of the probability density predicted by quantum mechanics.

Furthermore, the fractional separation of the eigenvalues approach zero as "n" approaches inifinity, so that this becomes a limiting factor in that their discreteness cannot be resolved. We have observed that quantum mechanical predictions actually approach the predictions of classical mechanics in the large quantum number, or high density limit. This is to be expected from the correspondence principle of the old quantum theory.

Reference is also made to my prior granted patents, U.S. Pat. Nos. 4,113,589 and 4,148,701, which are directed to related inventions. More specifically, the efficiency of the apparatus disclosed in the present specification is enhanced, as in the case of the earlier inventions in part as a result of the low energy content gaseous products which are released in the course of the process. These low energy gasous products may include HO and $HO_2$, which are less well known gaseous products. When these gaseous products are released into the atmosphere, it is believed that they absorb high frequency radiations, and eventually change state, become hydrogen gas, oxygen gas, water vapor, atomic hydrogen and atomic oxygen, with the inputs to the present system including water and oxygen in air. In one sense, therefore, the present system may be considered to utilize solar energy.

It is also noted that the prior copending U.S. patent application Ser. No. 879,226 discloses a number of chain reactions in addition to those of the type shown in FIG. 16. These other types of chain reactions, including gases other than water vapor, could be implemented by the present invention. Some of these reactions included the reaction of hydrogen gas with chlorine to form HCl gas; the reaction of methane with chlorine to form methyl chloride; hydrogenation and olefin formation; the dehydration of alcohols; additional reactions of olefins; and to reactions involving poly-substituted saturated hydrocarbons, benzene, unsaturated hydrocarbons, including the alkyne series, alcohols, carboxylic acids, aldehydes, and ketones.

For completeness, reference is made to certain text material relating to ionization. These include a 1958 text entitled, "Gaseous Conductors" by James Dillon Cobine, Dover Publications, Inc., 180 Varick Street, New York, N.Y., 10014, in which note particularly pages 86 through 91; and "Atom and Ion Sources", by L. Valyi, John Wiley & Sons, London, 1977, in which pages 24 through 45 are of interest.

Also, concerning another aspect of the present invention, in connection with FIG. 9 of the drawings, the matter of coatings which reflect longer wavelength, and which freely transmit wavelengths in the far ultraviolet region, were noted, and the advantages of thin aluminum films was brought out. Other films which could be employed include a film of magnesium on chromium, which has a cutoff frequency in the range between 2000 and 1200 angstroms. Films of iron are also useful for certain applications. It is further noted that successive layers of certain dielectric coatings, either alone or in combination with other layers, have been developed which can be designed to cut off at desired frequencies.

Returning now to FIG. 1, it is noted that the electrical switching and power supply circuit 32 provides sequential energization of the mercury vapor discharge devices within the reaction chambers 21 through 26, with switching circuitry being of conventional configuration, and avoiding the need for a higher capacity power supply. Concerning the feedback tubes 60 from the manifold 54 to the individual reaction chambers 21 through 26, these feedback arrangements may be connected to any desired point along the reaction chambers, and could be connected centrally if desired or to the input point in each of these reaction chambers 21 through 26. It is further noted that, along with the water vapor supplied from the steam generator 40 through the tubing 42, additional oxygen or air may be supplied to each of the reaction chambers through the inlet conduit 42. This would permit the formation of larger quantities of hydrogen peroxide, $H_2O_2$, when larger quantities of this output gas are desired.

Incidentally, concerning operating parameters of the system, the six gas discharge tubes may be one inch in diameter and approximately 51 inches long; they may have quartz, pyrex, or lime glass envelopes, and may operate with a voltage of 10,000 volts at about seven amperes, for each tube. Concerning pressures, to avoid condensation of the water vapor the temperature in the reaction chamber should be maintained above 100 degrees Centigrade, and could be as high as several hundred degrees. With regard to pressure, it is contemplated that the reaction chambers may operate at from one to several atmospheres pressure. Although the system would be operative at high temperatures and pressures, less problems are encountered at the indicated ranges.

In closing, it is emphasized that the present invention is not limited to the precise structure as illustrated in the drawings and described in the foregoing detailed description. More specifically, other resonator configurations could be employed, both of the passive and active types; the reaction chambers could be operated in parallel rather than in series, either in whole or in part; and the reaction chambers could be if desired, of a more circuitous design, for example, with quartz tubes or helical metal baffles providing longer paths for each of the individual water vapor molecules; and other changes in mechanical, optical, or electrical configuration may be made within the scope of the invention as taught. Accordingly, the invention is not limited to the precise illustrated configurations.

What is claimed is:

1. An apparatus for controlled photochemical reactions comprising:

a reaction chamber;

means for supplying feedstock to said reaction chamber, said feedstock having a predetermined frequency absorption band or bands;

means for flooding said reaction chamber with radiation within at least one of the absorption bands of said feedstock;

said radiation flooding means including at least one gas discharge tube having output radiation of a lower frequency than said predetermined band or bands and passive resonant chamber means in physical proximity to said gas discharge tube and also exposed to said reaction chamber for receiving said lower frequency radiation from said gas discharge tube and for supplying intense radiation to said reaction chamber within said predetermined band or bands; and said apparatus including frequency-selective film means for blocking visible light and permitting the transmission of ultraviolet wavelengths from said passive resonant chamber into said reaction chamber.

2. An apparatus as defined in claim 1 including a plurality of reaction chambers.

3. An apparatus as defined in claim 2 further comprising means for successively energizing the gas discharge tubes associated with the various reaction chambers.

4. An apparatus as defined in claim 2 further comprising means for feeding back a portion of the product gases generated by said reaction chambers into said reaction chambers.

5. An apparatus as defined in claim 2 further comprising manifold means for collecting the output gases from said reaction chambers, and means connected from said output manifold to each of said reaction chambers for feeding back a portion of the output gases to each of said reaction chambers.

6. A gas ionization apparatus comprising a gas discharge tube having a predetermined output radiation in a low frequency range;

a passive resonator coupled to receive said low frequency radiation, said passive radiator having an output zone; and frequency selective film means extending across the output from said passive resonator chamber for blocking the lower frequencies from said gas discharge means and for radiating higher ultraviolet frequencies generated within said passive resonator.

7. In combination:

means including a gas discharge tube for generating relatively low frequency output radiation;

means for directing additional gas having absorption bands at frequencies above said low frequency output radiation, in proximity to said gas discharge tube; and means located between said gas discharge tube and said gas directing means for shifting the frequency of the output radiation from said gas discharge tube to higher frequencies within said absorption bands, said means including a layer of material having high frequency transmittance characteristics which permits the transmission of high frequency within said absorption band, but blocks low frequency including at least some of the low frequency output from said gas discharge tube.

8. A combination as defined in claim 7 further comprising resonant cavity means enclosing said gas discharge tube and having output slots for radiating said higher frequency radiation into said additional gas.

9. A combination as defined in claim 8 wherein said slots are angled relative to the axis of the gas tube.

10. A combination as defined in claim 7 wherein said frequency shifting means includes a plurality of resonant cavities.

11. A combination as defined in claim 7 including resonant cavity means for receiving the low frequency radiation from said gas discharge tube and for initially containing it, and means for subsequently dumping higher frequency radiation from said cavity to dissociate said additional gas.

12. An apparatus for controlled photochemical reactions comprising:

a reaction chamber;

means for supplying freedstock to said reaction chamber, said feedstock having a predetermined frequency absorption band or bands; and means for flooding said reaction chamber with radiation within at least one of the absorption bands of said feedstock;

said means including at least one gas discharge tube having output radiation of a lower frequency than said predetermined band or bands and frequency shifting means in physical proximity to said gas discharge tube and also exposed to said reaction chamber for receiving said lower frequency radiation from said gas discharge tube and for supplying intense radiation to said reaction chamber within said predetermined band or bands, said frequency shifting means including a layer of frequency selective material which transmits higher frequencies in said absorption bands, and reflects lower frequencies.

13. A combination as defined in claim 12 further comprising resonant cavity means enclosing said gas discharge tube and having output slots for radiating said higher frequency radiation into said additional gas.

14. A combination as defined in claim 12 wherein said frequency shifting means includes a plurality of resonant cavities.

15. A combination as defined in claim 12 including resonant cavity means for receiving the low frequency radiation from said gas discharge tube and for initially containing it, and means for subsequently dumping higher frequency radiation from said cavity to dissociate said additional gas.

16. A photochemical reaction apparatus comprising:

a plurality of gas discharge tubes;

a plurality of photochemical reaction chambers associated respectively with said gas discharge tubes;

means for shifting the output radiation frequencies from said gas discharge tubes upward to higher frequencies for application to said reaction chambers, for precipitating chain dissociation reactions therein; and means for energizing said gas discharge tubes sequentially and cyclically.

17. An apparatus as defined in claim 16 wherein said frequency shifting means includes a film having a high pass transmittance characteristic which is reflecting for substantially all of the output radiation of said gas discharge tubes.

18. An apparatus as defined in claim 17 further comprising individual resonant cavity means for receiving lower frequency radiation from each said gas discharge tubes and for supplying higher frequency radiation through said film to each said reaction chamber.

19. An apparatus as defined in claim 16 further comprising manifold means for collecting product gas from said reaction chambers.

20. An apparatus as defined in claim 19 further comprising means for unidirectionally feeding product gas back from said manifold means to one or more of said reaction chambers.

21. An apparatus as defined in claim 16 wherein each of said gas discharge tubes is substantially enclosed by one of said reaction chambers.

22. A method for ionizing or dissociating gas comprising the steps of:
supplying a gas discharge having relatively low frequency output radiation;
supplying a gas to be ionized or dissociated to a reaction chamber adjacent said gas discharge, said gas having strong absorption bands at higher frequencies than the lower frequency gas discharge output radiation;
intercoupling the gas discharge radiation and the reaction chamber by a resonant cavity and a filtering layer of material which blocks lower frequency radiation and transmits higher frequency radiation within said absorption bands;
compressing the gas discharge radiation to shorter wavelengths within said cavity, the shorter wavelength radiation being within the absorption bands of said gas to be ionized; and
dumping the higher frequency radiation into said reaction chamber to precipitate chain ionization and dissociation reactions.

23. A method as defined in claim 22 further including the steps of sequentially and cyclically initiating gas discharges in a series of gas discharge tubes.

24. A highly efficient method of obtaining hydrogen and/or hydrogen peroxide from steam comprising:
supplying water vapor to a reaction chamber, said water vapor having a radiation absorption characteristic including predetermined absorption bands;
applying high intensity radiation to said water vapor within said absorption bands at an intensity substantially above the level required to split the hydrogen gas from the water vapor and to produce hydrogen gas and activated oxygen atoms; and
maintaining said activated oxygen ions in contact with water vapor at concentrations sufficient to create a chain reaction with each activated oxygen atom reacting with at least one additional water vapor molecule, on the average, to form hydrogen gas or hydrogen peroxide.

25. A method as defined in claim 24 further comprising the step of supplying air to said reaction chamber to facilitate the formation of hydrogen peroxide.

26. A method as defined in claim 24 wherein said radiation is supplied in the ultra-violet frequency spectrum.

27. A method as defined in claim 24 including the supplying of radiation from a gas discharge tube.

28. A method as defined in claim 24 including the steps of providing a gas discharge to generate radiant energy at a frequency below said absorption bands, and converting the lower frequency radiant energy from said gas discharge into high intensity radiation within said absorption bands prior to application to the water vapor.

29. A highly efficient method of initiating chain chemical reactions comprising:
supplying feedstock to a reaction chamber, said feedstock having a radiation absorption characteristic including predetermined absorption bands;
flooding said reaction chamber with high intensity radiation within at least one of said absorption bands at an intensity substantially above the level required to dissociate said feedstock; and
maintaining the dissociation product in said reaction chamber at concentrations sufficient to create a chain reaction with the incoming feedstock.

30. A method as defined in claim 29 including the step of supplying radiation of at least two different frequencies to said reaction chamber to form sum and difference frequencies upon impingement upon media discontinuities formed by the feedstock, at least one of said sum frequencies being within at least one of the absorption bands of one of said feedstocks.

31. A method as defined in claim 29 including the step of creating a gas discharge within a transparent envelope within said reaction chamber to irradiate the feedstocks supplied to said chamber.

32. A method as defined in claim 31 including the step of supplying pumping energy to excite laser type material provided in said reaction chamber to produce substantially coherent output radiation.

33. A method as defined in claim 32 including the step of flooding said reaction chamber with radiation both from said laser type material and from said gas discharge device to provide sum and difference frequencies when the radiations impinge on media discontinuities created by the presence of said feedstocks within said reaction chamber.

34. A method as defined in claim 29 including the steps of providing a gas discharge to generate radiant energy at a frequency below said absorption bands, and converting the lower frequency radiant energy from said gas discharge into high intensity radiation within said absorption bands prior to application to the feedstock.

35. A method as defined in claim 34 including the step of filtering the radiation applied to said reaction chamber to block said lower frequency radiant energy and to transmit radiation within said absorption bands.

36. A method as defined in claim 34 including the step of supplying the radiation from said gas discharge to a resonant chamber and from the resonant chamber to the reaction chamber.

37. A method as defined in claim 34 including the steps of generating higher frequency coherent energy from said gas discharge and of applying said higher frequency energy to said reaction chamber.

38. A method as defined in claim 29 wherein at least two feedstocks are supplied to said reaction chamber.

39. A method for obtaining hydrogen or hydrogen peroxide from water vapor comprising the steps of:
directing water vapor through a reaction zone, said water vapor having predetermined absorption frequency bands;
flooding said reaction zone with radiation at intensity levels at least double that required to dissociate water vapor, and derived from gas discharge tubes, within said absorption frequency bands to obtain combustible hydrogen or hydrogen peroxide from said water vapor.

40. A method for ionizing or dissociating gas comprising the steps of:
   initiating a gas discharge having relatively low frequency output radiation;
   supplying a gas to be ionized or dissociated to a reaction chamber adjacent said gas discharge, said gas having strong absorption bands at higher frequencies than the lower frequency gas discharge output radiation;
   shifting the output radiation from said gas discharge to a higher frequency within the absorption bands of said gas to be ionized, said frequency shifting step including the filtering of said radiation by material which blocks at least some of said low frequency radiation and which is transparent to higher frequency radiation within said absorption bands, and
   applying the higher frequency radiation into said reaction chamber to precipitate chain ionization and dissociation reactions.

41. A method as defined in claim 40 including the step of filtering the radiation applied to said reaction chamber to block said lower frequency radiant energy and to transmit radiation within said absorption bands.

* * * * *